(12) United States Patent
Wagoner et al.

(10) Patent No.: US 7,219,080 B1
(45) Date of Patent: May 15, 2007

(54) CONTINUOUS ONLINE AUCTION SYSTEM AND METHOD

(75) Inventors: Kevin J. Wagoner, Rialto, CA (US); Tim Walker, Tustin, CA (US); Jin Seo Lee, Santa Ana, CA (US); Michael C. Tedesco, Chino, CA (US); Danny Le, Moreno Valley, CA (US); Zane Adam Rathwick, Laguna Hills, CA (US); Max Adeli, Irvine, CA (US)

(73) Assignee: Autobytel.Com, Inc., Irvine, CA (US)

( * ) Notice: Subject to any disclaimer, the term of this patent is extended or adjusted under 35 U.S.C. 154(b) by 0 days.

(21) Appl. No.: 09/283,120

(22) Filed: Mar. 31, 1999

(51) Int. Cl.
*G06Q 40/00* (2006.01)

(52) U.S. Cl. ........................................ 705/37

(58) Field of Classification Search ............... 705/37, 705/26, 27, 35, 36
See application file for complete search history.

(56) References Cited

U.S. PATENT DOCUMENTS

| | | | |
|---|---|---|---|
| 5,283,731 A | 2/1994 | Lalonde et al. | |
| 5,592,375 A | 1/1997 | Salmon et al. | |
| 5,671,279 A | 9/1997 | Elgamal | |
| 5,710,887 A | 1/1998 | Chelliah et al. | |
| 5,774,873 A | 6/1998 | Berent et al. | |
| 5,835,896 A | 11/1998 | Fisher et al. | |
| 5,842,178 A | 11/1998 | Giovannoli | |
| 5,845,265 A * | 12/1998 | Woolston | 705/37 |
| 6,012,045 A * | 1/2000 | Barzilai et al. | 705/37 |
| 6,044,363 A * | 3/2000 | Mori et al. | 705/37 |
| 6,131,087 A * | 10/2000 | Luke et al. | 705/26 |

OTHER PUBLICATIONS

Dialog (R) File: IAC Prompt (R) (c) 1999 Information Access Co., "Car Auction Reaches Into Space," Automotive News, Nov. 25, 1991 p. 6. Maskery, M.

* cited by examiner

*Primary Examiner*—Hani M. Kazimi
(74) *Attorney, Agent, or Firm*—Knobbe Martens Olson & Bear, LLP (57) ABSTRACT

A continuous online auction system and method enabling the auctioning of products. An online product auction system comprises an auction center having a microprocessor operably connected to a storage media. The online product auction system also includes a product receive module configured to execute in the auction center. The product receive module is further configured to receive a set of product data for a first product to be auctioned wherein the product data includes one or more seller parameters. The online product auction system further includes a seller proxy module configured to execute in the auction center. The seller proxy module is configured to modify one or more seller parameters for the product based upon one or more auction parameters for the first product.

4 Claims, 5 Drawing Sheets

CONTINUOUS ONLINE AUCTION SYSTEM AND METHOD

RELATED APPLICATIONS

The present application is related to the commonly owned U.S. patent application entitled REAL TIME COMMUNICATION OF PURCHASE REQUESTS having the Ser. No. 09/231,409, filed Jan. 14, 1999, and now U.S. Pat. No. 6,282,517, and which is hereby incorporated herein by reference in its entirety.

BACKGROUND

1. Field

The present invention is related to systems and methods for conducting transactions using networked computers. More particularly, the invention relates to a system and method for performing an online auction.

2. Description of the Related Art

Traditional auctions usually require the physical gathering of the products and the bidders at a predetermined location. An auction is scheduled to occur at a specific location at a scheduled time. Typically, interested bidders show up at the location prior to the scheduled auction time to inspect the items to be auctioned off. The bidders then attend the auction, wait for the interested products to be auctioned, and bid on these interested products.

At these traditional auctions, the products are disadvantageously made available to the interested bidders for a limited duration prior to the scheduled auction. During this limited time, the interested bidder has the task of inspecting the products which are of interest and to "book out" the product one at a time. Typical auctions may involve hundreds of products, and determining a value for each product in such a short period of time is inherently inefficient. Moreover, requiring the products to be transported to the auction location adds increased inefficiencies in the distribution channel between the seller and the buyer.

Traditional auctions have the further disadvantage that products are generally auctioned off one at a time. The auctioneer typically places a product up for auction and solicits bids from the auction floor. Once the highest bid is accepted, the product is closed to further bidding, and the next product is brought forward. This process of auctioning off one product at a time in a sequential manner is limiting because the interested bidder may have to wait through the entire auction in order to place a bid on the interested products. Moreover, because of the high number of products and the limited auction time, a product is presented for auction for only a very short period of time. Thus, a potential bidder is not afforded the luxury of time in deciding whether to place a bid.

At some auctions, more than one auctioneer is active at a time, and thus, more than one product is capable of being auctioned off at a time. This is more efficient in that more products may be auctioned off in a lesser period of time. But, simultaneous auctions require the interested bidder to concurrently monitor more than one auction to ensure that an interested product is not missed. This is inefficient because more than one bidder representing the same buyer has to be present at the auction. Further inefficiencies are introduced because the products cannot be auctioned off simultaneously to the same group of bidders.

More recently, the World Wide Web ("www") has experienced an increasing number of auction sites. Typically, a seller places a product up for auction through one of these sites. The seller provides information such as, by way of example, a product description, including a photograph of the product in some instances, the duration of the auction, and possibly a required minimum selling price. This information is presented through one or more web pages. A bid history is also presented through one or more web pages so that interested bidders may place a valid bid on a desired product.

These auction systems enable the simultaneous auctioning of products as well as increasing the duration of time a product is presented for auction. But, conventional auction systems are inefficient because the participating bidders have to continuously monitor their auctions in order to keep abreast of the bidding activity. Furthermore, these systems have the added disadvantage in that the interested bidders have to continuously search for active auctions involving products of interest.

Having placed a product up for auction, the seller generally loses the flexibility of altering certain auction parameters during the auction period. For example, the seller may not be permitted to alter information such as the bidding increments, the minimum starting bid, or the minimum acceptable selling bid. This is generally inefficient because the seller has to wait through an unsuccessful auction before adjusting the auction parameters such that a successful auction may result.

SUMMARY

In one embodiment of the invention, an online product auction system facilitates an efficient utilization of both the seller's and bidder's resources during a vehicle auction. The online product auction system comprises: (1) an auction center having a microprocessor operably connected to a storage media; (2) a product receive module configured to execute in the auction center, the product receive module configured to receive a first product data associated with a first product to be auctioned wherein the first product data includes one or more seller parameters; and (3) a seller proxy module configured to execute in the auction center, the seller proxy module configured to modify the one or more seller parameters such as the start minimum bid based upon one or more auction parameters for the first product such as how many bids have been received. In one aspect of the embodiment, the auction center is configured to be connected to a network and the first product data is received over the network. In another aspect of the embodiment, the seller proxy module executes substantially on the hour every hour. In yet another aspect of the embodiment, the seller proxy module executes based on a seller provided time interval. In a further aspect of the embodiment, the first product data is received over a network.

In another embodiment, a method of auctioning a first product, the first product associated with one or more seller parameters, the first product associated with one or more auction parameters, comprises the acts of: (1) receiving the one or more seller parameters from a first seller; and (2) modifying the one or more seller parameters based upon the one or more auction parameters. In one aspect of the embodiment, the one or more seller parameters includes a start minimum bid. In another aspect of the embodiment, the one or more seller parameters includes a reserve bid. In yet another aspect of the embodiment, the one or more seller parameters includes a decrement amount. In a further aspect of the embodiment, the one or more seller parameters includes a low minimum bid. In yet a further aspect of the embodiment, the one or more seller parameters includes a low reserve bid. In still a further aspect of the embodiment, the one or more auction parameters includes a bid count. In another aspect of the embodiment, the modifying is based on a time interval, the time interval is dynamically determined.

In yet another embodiment, a seller proxy system comprises: (1) a means for receiving a first product data associated with a first product, the first product data includes one or more seller parameters; (2) a means for determining one or more auction parameters for the first product; and (3) a means for modifying the one or more seller parameters based upon the one or more auction parameters for the first product.

In still another embodiment, a method of calculating a current high bid for a first product in an auction center, wherein the auction center includes a microprocessor operably connected to a storage media, the auction center configured to be operably connected to at least one buyer terminal, comprises the acts of: (1) receiving a first bid for the first product from a first bidder, the first product is associated with a start minimum bid; and (2) setting the current high bid to the start minimum bid when a first condition is met. In one aspect of the embodiment, the current high bid is set equal to the first bid when a second condition is met. In another aspect of the embodiment, the first bid is received from the buyer terminal. In yet another aspect of the embodiment, the auction center is configured to be operably connected to a network. In still another aspect of the embodiment, the network is the Internet.

In a further embodiment, an online product auction system comprises: (1) an auction center having a microprocessor operably connected to a storage media, the auction center configured to be connected to a network, the auction center configured to receive at least a first bid for a first product from a first bidder, wherein the first product is associated with a start minimum bid; and (2) a bid processing module operably connected to the storage media and configured to execute in the auction center, the bid processing module sets a current high bid to the start minimum bid when a first condition is met. In one aspect of the embodiment, the current high bid is set equal to the first bid when a second condition is met.

In a yet a further embodiment, a method for proxy bidding in an auction center, wherein the auction center includes a microprocessor operably connected to a storage media, comprises the acts of: (1) receiving a first bid and a second bid for the first product from a first bidder, the second bid is at least as large as the first bid; (2) receiving a third bid and a fourth bid for the first product from a second bidder, the fourth bid is at least as large as the third bid; and (3) setting a current high bid to be larger than the third bid when the first bid is smaller than the third bid and the fourth bid is smaller than the second bid. In one aspect of the embodiment, the method for proxy bidding further comprises the acts of: (1) receiving a first proxy increment from the first bidder; and (2) setting the current high bid to be larger than the third bid by the first proxy increment. In another aspect of the embodiment, the current high bid is set to the third bid plus a proxy increment.

In still a further embodiment, a method for calculating a current high bid for a first product in an auction center comprises the acts of: (1) receiving a first bid data for the first product, the first bid data includes a first bid and a second bid; (2) receiving a second bid data for the first product, the second bid data includes a third bid and a fourth bid; and (3) setting a current high bid for the first product to be larger than the smaller of the second bid and the fourth bid when a first condition is met. In one aspect of the embodiment, the current high bid is set to the sum of a proxy increment and the smaller of the second bid and the fourth bid when a first condition is met. In another aspect of the embodiment, the current high bid is set to the second bid when a second condition is met. In yet another aspect of the embodiment, the current high bid is set to the first bid when a third condition is met. In still another aspect of the embodiment, the current high bid is set to the third bid when a fourth condition is met. In a further aspect of the embodiment, the current high bid is set to the fourth bid when a fifth condition is met. In yet a further aspect of the embodiment, the calculating includes comparing a receive time for the first bid data and a receive time for the second bid data.

In one embodiment, a method for calculating a new high bid for a first product from a current high bid for the first product and a subsequent bid data for the first product, the current high bid is associated with a current high bid data wherein the current high bid data includes a first bid and a second bid, the current high bid at least as large as the first bid, the current high bid less than or equal to the second bid, comprises the acts of: (1) receiving the subsequent bid data for the first product, the subsequent bid data includes a third bid and a fourth bid, the fourth bid at least as large as the third bid; and (2) setting the new high bid to a value larger than the fourth bid when a first condition is met. In one aspect of the embodiment, the new high bid is larger than the fourth bid by a proxy increment. In another aspect of the embodiment, the new high bid is set to a value larger than the second bid when a second condition is met. In yet another aspect of the embodiment, the new high bid is larger than the second bid by a proxy increment. In still another aspect of the embodiment, the new high bid is set to the fourth bid when a third condition is met. In a further aspect of the embodiment, the new high bid is set to the current high bid when a fourth condition is met.

In another embodiment, an online product auction system comprising an auction center, the auction center includes a microprocessor operably connected to a storage media, comprises: (1) a first bid data for a first product, the first bid data includes a first bid and a second bid, the second bid is at least as large as the first bid; (2) a second bid data for the first product, the second bid data includes a third bid and a fourth bid, the fourth bid is at least as large as the third bid; and (3) a bid processing module which calculates a high bid for the first product. In one aspect of the embodiment, the bid processing module further comprises: (1) a first calculation mode which calculates the high bid for the first product when the product auction system is in a first state; and (2) a second calculation mode which calculates the high bid for the first product when the product auction system is in a second state.

In yet another embodiment, an online product auction system comprising an auction center, the auction center includes a microprocessor operably connected to a storage media, comprises: (1) a current high bid for a first product, the current high bid is associated with a first bid data wherein the first bid data includes a first bid and a second bid, the second bid is at least as large as the first bid; (2) a second bid data for the first product, the second bid data includes a third bid and a fourth bid, the fourth bid is at least as large as the third bid; and (3) a bid processing module which calculates a new high bid for the first product.

In still another embodiment, a method of consummating a sale of a first product in an auction center comprises the acts of: (1) determining a winning bidder; (2) informing an escrow provider of the sale, the escrow provider consummates an exchange of the first product and the winning bid;

(3) receiving confirmation of the exchange from the escrow provider; and (4) removing the sale from the auction center.

In a further embodiment, an online product auction system comprising an auction center, the auction center includes a microprocessor operably connected to a storage media, comprises: (1) a bid processing module which determines a winning bidder for a first auction; (2) an escrow module which informs an escrow service provider of a result of the first auction, the result includes a first product, the result includes a seller of the first product, the result includes a winning bid for the first product, the result includes a winning bidder of the first product; and (3) a sale finalize module which receives a confirmation of an exchange of the first product and the winning bid between the seller and the winning bidder; the sale finalize module removes the first auction from the auction center.

In yet a further embodiment, a method of searching one or more auctions in an auction center, the auction center includes a microprocessor operably connected to a storage media, the auction center configured to be operably connected to at least one user terminal, comprises the acts of: (1) receiving one or more filtering parameters; (2) identifying the one or more auctions that satisfy the one or more filtering parameters; and (3) displaying one or more auction data for the one or more identified auctions in a scrolling ticker on a user terminal, the one or more auction data is a hypertext link to a first web page associated with the action data.

In still a further embodiment, an event notification method in an auction center comprises the acts of: (1) receiving a first product from a seller, the first product is associated with a first product auction; (2) receiving one or more auction events for the first product auction from the seller; and (3) notifying the seller upon the occurrence of the one or more auction events.

In one embodiment, an event notification method in an auction center, the auction center includes a first product auction for a first product, comprises the acts of: (1) receiving a first bid for the first product in the first product auction from a bidder; (2) receiving one or more bid events for the first product auction from the bidder; and (3) notifying the bidder upon the occurrence of the one or more bid events.

In another embodiment, an auction notification method in an auction center comprises the acts of: (1) receiving one or more auction search criteria from a potential bidder; (2) receiving one or more products, the one or more products associated with one or more product auctions, wherein the one or more product auctions are in a first state; (3) identifying the one or more product auctions that satisfy the one or more auction search criteria, the identifying performed when the one or more product auctions transitions to a second state; and (4) notifying the potential bidder of the one or more identified product auctions.

BRIEF DESCRIPTION OF THE DRAWINGS

These and other aspects, advantages, and novel features of the invention will become apparent upon reading the following detailed description and upon reference to accompanying drawings in which.

DETAILED DESCRIPTION

In one embodiment, an online product auction system includes an auction center. The auction center provides a network connection to which one or more seller terminals and one or more buyer terminals, as well as other network devices, may advantageously be networked. The auction center may advantageously utilize a web server to provide a network connection over a public network such as the World Wide Web ("www") or a private network. The auction center includes information regarding one or more products and facilitates the auctioning of the products by enabling potential buyers of the products to bid on the products by utilizing the buyer terminal.

Several modules will be described hereafter. The modules may advantageously be implemented as one or more computer program modules configured to reside on an addressable storage medium operably connected to one or more microprocessors. The modules may advantageously be configured to execute on the one or more microprocessors. An addressable storage medium will be further described below.

The auction center advantageously receives one or more products from one or more sellers. As an example, a seller may use a seller terminal to submit a product into the auction center. A product is associated with a corresponding set of product data and one or more auction parameters. The corresponding set of product data and one or more auction parameters can be considered a product auction. The set of product data may advantageously include information such as, by way of example, a product identification and one or more seller parameters such as a seller identification, a start minimum bid, a reserve bid, a decrement amount, and a low minimum bid. The auction parameter may be information such as, by way of example, a current high bid, a current high bidder, a start time, an auction timer, a bid count, a winning bid, and a winning bidder. The auction center can facilitate a product auction by utilizing information maintained in the seller parameters and one or more auction parameters.

In one embodiment, a seller proxy module executes in the auction center and may advantageously perform a seller proxy based upon one or more auction parameters. The seller proxy modifies one or more seller parameters during the product auction on behalf of the seller. As an example, the auction center may lower a start minimum bid if there are no bids in the product auction. Thus, in contrast to conventional auctions, the seller does not have to wait until a product auction completes unsuccessfully before re-auctioning the product with modified seller parameters. The auction center can monitor the product auction and modify one or more seller parameters associated with the product auction to increase the probability of a successful product auction.

A seller may advantageously request the auction center to notify the seller upon the occurrence of an event associated with the seller's product auction. The events may advantageously include one or more of the following: a transition from one product auction state to another product auction state, a seller proxy, a successful product auction, and a receipt of a bid. The seller may further specify the form the notification is to take place. Thus, the seller does not have to expend resources to unnecessarily monitor the seller's product auction. Rather, the auction center can be configured to automatically notify the seller accordingly, thus enabling the seller to make better use of the seller's resources.

A bidder uses a buyer terminal and a web browser executing on the buyer terminal to establish a connection over the network to the auction center. Once connected, the auction center advantageously displays a web page which the bidder can use to log on to and navigate through the auction center to locate a desired product auction. The bidder can then place a proxy bid in the desired product auction using the one or more web pages displayed on the buyer terminal.

A bid processing module executes in the auction center and processes an incoming bid in a product auction contained in the auction center. More particularly, the bid processing module is configured to accept a proxy bid request in the product auction from a bidder. The proxy bid request may include bid parameters such as, by way of example, an initial bid and a top bid. The initial bid and the top bid are used by the bid processing module to perform proxy bids on behalf of the bidder. The initial bid is the bidder's first bid for the product. The top bid is a cap figure that the bid processing module is not to exceed in generating a proxy bid. The bid processing module will then advantageously bid on behalf of the bidder if a subsequent bidder places a higher bid in the product auction. The bid processing module generates a proxy bid on behalf of the bidder as long as the higher bid submitted by the subsequent bidder does not exceed the top bid specified by the bidder. In another embodiment, the bidder may further specify a bid increment to be used by the bid processing module in generating a proxy bid on the bidder's behalf. In yet another embodiment, the bidder may further specify a time parameter which is used in delaying the bidder's proxy bids. As an example, the bidder may specify that his or her proxy bids are to be submitted ten (10) minutes after a subsequent higher bid is received from a different bidder. As another example, the bidder may specify that his or her proxy bids are to be submitted twenty (20) minutes before the close of the auction.

In one embodiment, if the top bid specified by the bidder is insufficient for the bid processing module to generate a proxy bid on behalf of the bidder, the auction center is advantageously configured to alert the bidder of the insufficient top bid. As an example, the auction center may alert the bidder by sending an e-mail message. Once alerted, the bidder may place a subsequent bid, or another proxy bid, in the desired product auction. Thus, in contrast to conventional auctions, the bidder does not have to continuously monitor the product auction to determine if the bidder has been outbid. The auction center permits the bidder to effectively specify a range of bids that are acceptable to the bidder by placing a proxy bid. The lowest possible bid in the range of bids becomes the bidder's effective bid. The auction center can advantageously monitor the product auction for the bidder and place subsequent bids when necessary on behalf of the bidder. Furthermore, the auction center may advantageously alert the bidder if a subsequent bid is higher than the range of bids specified by the bidder thus precluding the auction center from placing a proxy bid on behalf of the bidder. Thus, rather than the bidder having to expend resources to monitor interested product auctions, the auction center facilitates a better utilization of the bidder's resources.

Even though the invention is suitable for auctioning any product, the invention will be further disclosed in the context of auctioning a vehicle. Throughout the drawings, components which correspond to components shown in previous figures are indicated using the same reference numbers.

The conventional vehicle auctions are inherently inefficient. Typically, a vehicle auction provider establishes a date, time, and location for a vehicle auction. The vehicles to be auctioned off, which may number in the thousands, are transported to the auction site in preparation for the vehicle auction. The interested buyers gather at the auction site one or two days prior to the scheduled auction to inspect, and "book out," the vehicles one vehicle at a time. At this time, the potential buyers select the vehicles of interest, and initially associate a bid value to the selected vehicles.

The actual auction typically includes one or more auction lines. The vehicles are lined up, one after another, at one end of the auction line. The vehicles then proceed down the auction line. When a vehicle reaches a designated point on the auction line, typically the end of the auction line, the vehicle is put up for bidding. The bidding process typically takes no more than a few minutes. At the close of the bidding, the vehicle proceeds off the line, and the subsequent vehicle proceeds forward, and is put up for bidding. The potential buyers stand on both sides of the auction line and place bids as the vehicles are put up for bidding. For each auction line, one vehicle can be put up for bidding at a given time. Therefore, if the auction involved three auction lines, there could be three vehicles up for bidding simultaneously. Accordingly, it is not uncommon for several bidders representing one entity to be attending a single vehicle auction in order to adequately cover the multiple auction lines. Thus, the conventional vehicle auction typically generates a high degree of tension in that the vehicles are auctioned of in rapid succession. Furthermore, the potential buyers may not have enough time to make proper bidding decisions.

Conventional electronic vehicle auctions, conducted using computers and dial-up connections, address some, but not all, of the problems associated with the conventional vehicle auctions. Typically, a vehicle auction provider sets the time and location for a vehicle auction. Potential buyers are thus alerted to dial into and log on to a particular location, generally a computer system executing an auction program, to participate in the vehicle auction. The vehicles to be auctioned off may be made available for inspection at a designated time prior to the scheduled vehicle auction. The inspection is typically performed over the dial-up connection, whereby a potential buyer inspects the vehicles by accessing vehicle descriptions, and possibly vehicle photographs, from a remote computer.

At the scheduled auction time, the vehicles proceed down an "electronic auction line" one vehicle at a time. The potential buyers are informed by the conventional auction system as the vehicles proceed down the electronic auction line. Much like the traditional auction, a vehicle is put up for bidding once it reaches a specific point on the electronic auction line. The bidding takes place over the computer network as potential buyers submit bids for the vehicle. The bidding process for a vehicle generally takes no more than a few minutes. Thus, conventional electronic vehicle auctions, while alleviating the need for the potential buyer to be physically at the auction site, fail to address the tension and inefficiency associated with the need to closely monitor the vehicles proceeding down the auction line and make split second bidding decisions. During the electronic vehicle auction, a potential buyer cannot divert his or her attention to any other task but the vehicle auction itself. Furthermore, vehicles which were not purchased during the auction, generally because they failed to generate the necessary bidding activity, typically are allocated for participation in another vehicle auction. The electronic vehicle auction system, because of the time limitation, does not provide a mechanism by which auction parameters may be modified while a vehicle is up for bidding in an effort to generate the necessary bidding interest.

In contrast to the conventional vehicle auctions, the present invention facilitates an efficient allocation of resources. A potential buyer may advantageously focus his or her attention on tasks other than the vehicle auction by requesting the vehicle auction system to perform one or more tasks on behalf of the potential buyer. As an example, the vehicle auction system can monitor the bidding activity and submit proxy bids on behalf of the potential buyer. Additionally, the vehicle auction system can notify the potential buyer of certain events, thus permitting the potential buyer to tend to other duties until attention is needed. A seller of a vehicle through a vehicle auction may likewise request the vehicle auction to perform one or more tasks on behalf of the seller. As another example, the seller may advantageously request the vehicle auction to perform one or more seller proxies on the seller's behalf. The vehicle auction can accordingly monitor the bidding activity associated with the vehicle auction and adjust one or more seller parameters to increase the probability of a vehicle sale.

In one embodiment of the invention, an online product auction system facilitates the auctioning of a vehicle. The product auction system provides a network connection with which a seller can access the product auction system over the network to submit a vehicle to be auctioned off by the product auction system. The product auction system offers the submitted vehicle in a vehicle auction. A potential buyer can access the product auction system through the network connection to place one or more bids in a vehicle auction.

Computer networks suitable for use with the present invention include local area networks (LAN), wide area networks (WAN), Internet, or other connection services and network variations such as the World Wide Web, the public internet, a private internet, a private computer network, a secure internet, a private network, a public network, a value-added network, and the like. The computers connected to the network may be any microprocessor controlled device that permits access to the network, including terminal devices, such as personal computers, workstations, servers, mini computers, main-frame computers, laptop computers, mobile computers, palm top computers, hand held computers, set top box for a TV, or a combination thereof. The computers may further possess input devices such as a keyboard or a mouse, and output devices such as a computer screen or a speaker. The computer network may include one or more LANs, WANs, Internets, and computers. The computers may serve as servers, clients, or a combination thereof.

Figure 1:
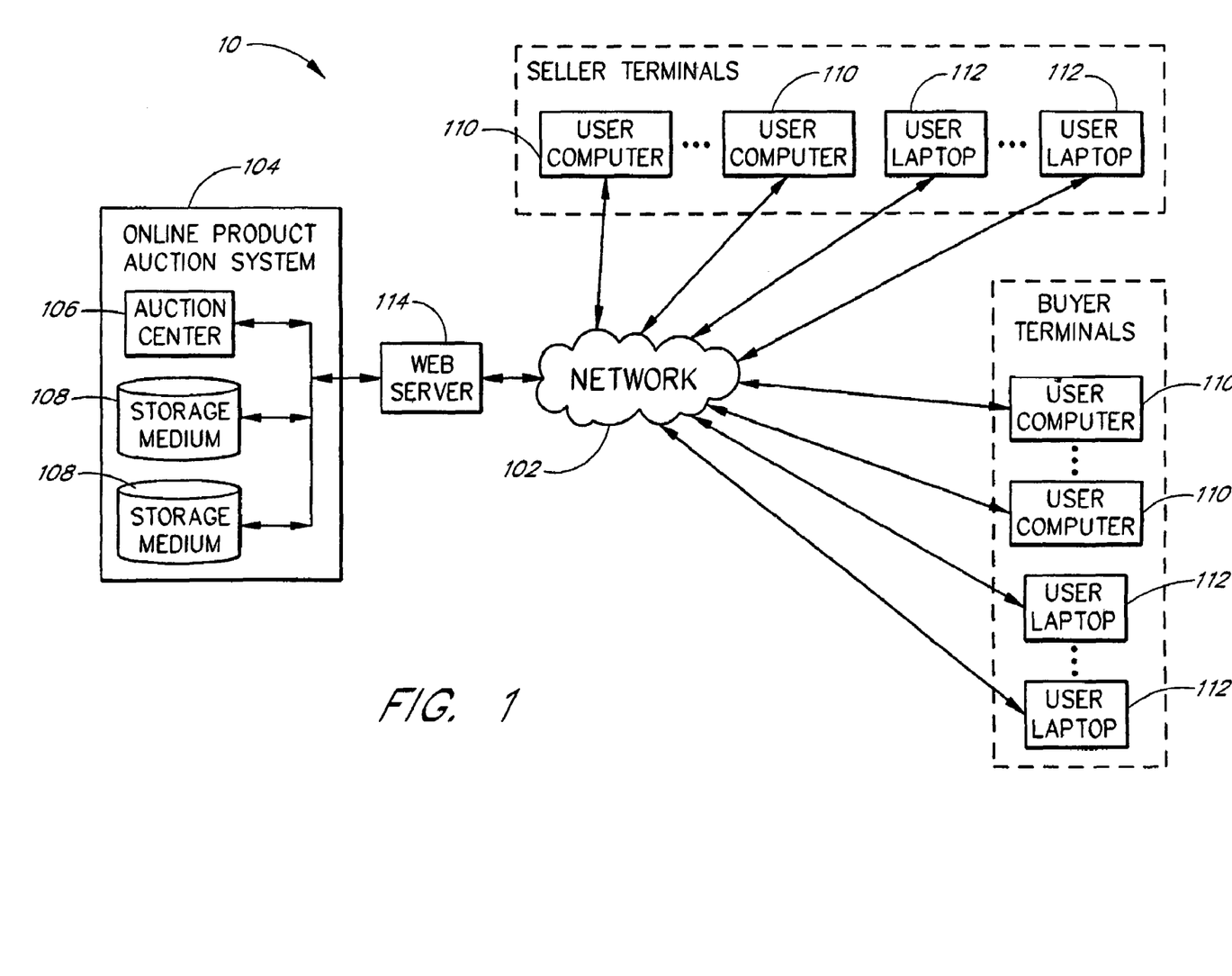
FIG. 1 is a block diagram illustrating an embodiment of the overall network architecture of the invention.

One network architecture suitable for use with one embodiment of the invention is indicated generally by a system 10 in FIG. 1. The system 10 may include a network 102, which represents a computer network as previously described, providing network connection between the attached devices. The system 10 may further include an online product auction system 104 which is connectable by one or more buyer terminals and one or more seller terminals through a web server 114. The online product auction system 104, the buyer terminals, and the seller terminals may be connected to the network 102 directly or through a connection device such as a router or other similar mechanisms.

In one embodiment, the system 10 conforms to the Transmission Control Protocol/Internet Protocol (TCP/IP) industry standard. In other embodiments, the system 10 may conform to other network standards, including, but not limited to, the International Standards Organization's Open Systems Interconnection, IBM's SNA®, Novell's Netware®, and Banyon VINES®, that facilitate communication between the attached devices.

In one embodiment of the invention, the online product auction system 104 includes an auction center 106 and one or more storage mediums 108. The auction center 106 is operably connected to a storage media such as, by way of example, random access memory, non-volatile storage media, or the storage medium 108. The online product auction system programs and the online product auction system databases comprising the online product auction system 104 preferably reside on one or more computers, which is any device having a microprocessor operably connected to some storage memory device, comprising the auction center 106 and one or more storage mediums 108. Those of ordinary skill in the art will realize that the storage mediums 108 may advantageously be contained in the computer(s) comprising the auction center 106.

These computers may be uniprocessor or multiprocessor machines. Additionally, these computers include an addressable storage medium such as, by way of example, random access memory, and may further include a non-volatile storage medium such as, by way of example, a magnetic or an optical disk. The addressable storage medium and/or the non-volatile storage medium may advantageously contain a specific physical substrate configuration such as, for example, a computer program, representing data and instructions which cause the computer to operate in a specific and predefined manner as described herein.

The network 102 may connect devices, such as a user computer 110 or a user laptop 112, for example, by use of a modem or by use of a network interface card. As illustrated, potential buyers and sellers may utilize such devices to remotely access the online product auction system 104 via the network 102. The device used to provide the buyer access to the online product auction system 104 and the auction center 106 may be referred to herein as a buyer terminal. The device used to provide the seller access to the online product auction system 104 and the auction center 106 may be referred to herein as a seller terminal. The terms buyer terminal and seller terminal are intended to include any device useful for providing access to the online product auction system 104. The buyer terminals and the seller terminals may also be referred to herein as user terminals. Moreover, the same device may function as both a buyer terminal and a seller terminal.

Although particular computer systems and network components are shown, those of ordinary skill in the art will appreciate that the present invention also works with a variety of other networks and components.

In accordance with one embodiment of the invention, the online product auction system 104 is connected to the Internet and utilizes the web server 114 to provide connection capabilities over a World Wide Web ("www"). The web server 114 may advantageously be executing a standard web server such as, by way of example, the Microsoft Internet Information Server. A remotely located potential buyer may access the online product auction system 104 by utilizing a standard web browser such as, by way of example, Netscape Communicator software, executing on a buyer terminal and establishing a network connection to the web server 114. Likewise, a remotely located seller may access the online product auction system 104 by utilizing a standard web browser executing on a seller terminal and establishing a network connection to the web server 114. Via the web server 114, the potential buyer and seller may advantageously be provided with web pages enabling the buyer and seller to access the online product auction system 104.

In one embodiment, the storage medium 108 may be configured as a database from which information can be both stored, updated, and retrieved. The information may advantageously include one or more of the following: product data, bid data, seller parameters, auction parameters, and definitions of one or more web pages comprising the online product auction system 104. The online product auction system programs may provide access to the information stored on the storage medium 108.

Figure 2:
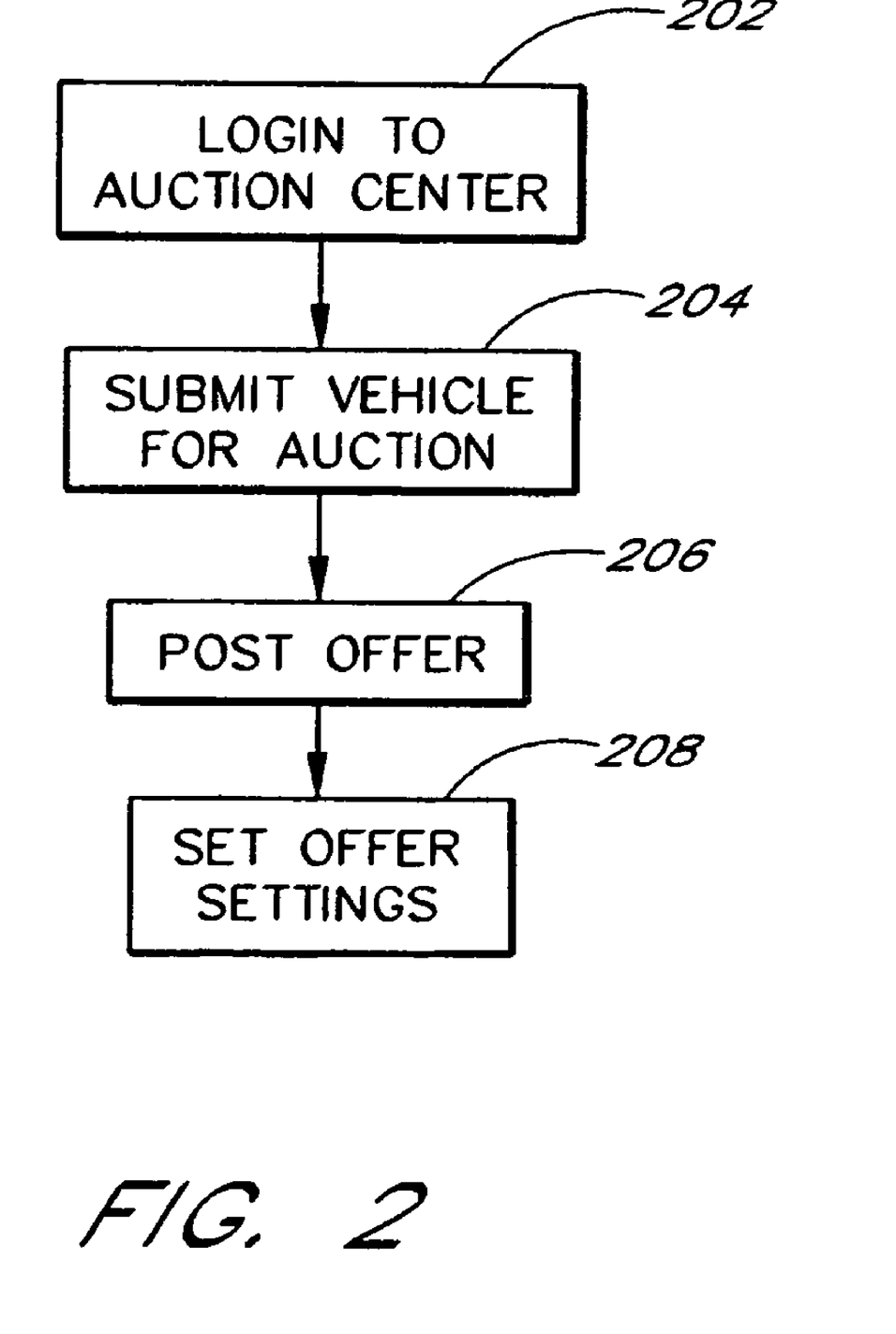
FIG. 2 is a flow chart illustrating a vehicle submission process according to one embodiment of the invention.

FIG. 2 is a flow chart generally illustrating a seller submitting a vehicle to the auction center 106 according to one embodiment of the invention. The subsequent steps may advantageously be implemented as one or more program modules configured to reside on one or more storage mediums 106 and execute on one or more processors residing in one or more auction centers 106. In particular, at a step 202, a potential seller utilizes a web browser executing on a seller terminal to access the auction center 106 login web page. The potential seller submits a login identification and a password pair through the login web page. In one embodiment, a unique login identification and password pair can be previously obtained from an auction center administrator. In another embodiment, the auction center 106 may include definitions of one or more web pages which may advantageously provide an online contract to the seller. The seller can then access and submit the online contract through the seller terminal and subsequently obtain a login identification and password pair with which to access the auction center 106.

At a step 204, the seller submits a vehicle to be auctioned off by the auction center 106. Each vehicle comprises a unique vehicle auction. In one embodiment, the seller can submit vehicles to the auction center 106 one vehicle at a time. Each vehicle can be identified by a set of product data stored in memory which is associated with the vehicle. The product data may advantageously be comprised of a vehicle identification and one or more seller parameters. A product receive module is configured to execute in the auction center 106 and received the product data associated with the vehicle. In another embodiment, the seller may also submit one or more sets of product data into the auction center 106 from a database. As an example, the product data may be contained in a database of the type detailed in the commonly owned U.S. patent application entitled REAL TIME COMMUNICATION OF PURCHASE REQUESTS having the Ser. No. 09/231,409, filed Jan. 14, 1999, and now U.S. Pat. No. 6,282,517, and which is hereby incorporated by reference in its entirety. In particular, the database can be comprised of one or more used vehicle records detailed in the aforementioned patent application. Those of ordinary skill in the art will realize that the database may be local to the online product auction system 104 or remotely located, and thus, connected to the online product auction system 104 via the network 102.

At a post offer step 206, the seller provides the seller parameters that additionally comprise the product data associated with the vehicle. The seller parameters preferably are one or more of the following: a start minimum bid, a reserve bid, a decrement amount, and a low minimum bid. The start minimum bid is the amount the seller would like the bidding for the seller's vehicle to start at. The auction center 106 makes the start minimum bid specified by the seller available to a potential bidder. The low minimum bid and the decrement amount are parameters used by the auction center 106 in performing seller proxies on behalf of the seller and are not made known to potential bidders. Every time a seller proxy is performed, the start minimum bid is decremented by the decrement amount. The low minimum bid is a floor figure which the start minimum bid cannot be set smaller than. The reserve bid is a contractual figure in that the seller is promising to sell the vehicle if a winning bid is at least as much as the specified reserve bid. The specified reserve bid, as well as the decrement amount and the low minimum bid, are not made known to potential bidders. Some or all of the seller parameters may not be required, and the omitted seller parameters may be supplied by the online product auction system 104.

In one embodiment, the start minimum bid is the desired starting bid that the seller is requesting for the vehicle auction. In one embodiment, the auction center 106 can accept bids less than the start minimum bid for the vehicle auction. In another embodiment, the auction center 106 can be configured to not accept any bids less than the start minimum bid amount. The reserve bid is the amount for which the seller is willing to sell the vehicle. If a winning bid for the vehicle auction is less than the reserve bid specified, the seller may, but is not obligated to, sell the vehicle for the winning bid. In one embodiment, the reserve bid may be specified to be any amount. In another embodiment, the auction center 106 may require the reserve bid amount to be as large as the start minimum bid amount.

For example, in a vehicle auction, the seller may specify a start minimum bid of $10,000 and a reserve bid of $8,000. In this instance, it may be advantageous for the auction center 106 to accept bids less than the start minimum bid of $10,000 in the vehicle auction. In one embodiment, the auction center 106 may advantageously accept bids less than the reserve bid of $8,000. This may allow interest in the vehicle auction to build and may lead to additional bids in the vehicle auction. The seller is not disadvantaged because the seller is not obligated to sell the vehicle for an amount less than the reserve bid of $8,000. In another embodiment, the auction center 106 may require a bidder to submit a bid amount greater than the reserve bid of 8,000. If the bid amount is less than $8,000, the auction center 106 can advantageously display an error message alerting the bidder of this fact. If the auction center 106 is configured to not accept bids less than the start minimum of $10,000, then the reserve bid of $8,000 may be rendered effectively meaningless, unless the seller has requested seller proxies, and the auction center 106 may advantageously set the reserve bid to the start minimum bid. In this instance, the auction center 106 may require the reserve bid to be as large as the start minimum bid. In still another embodiment, the start minimum bid may also function as the amount the seller is willing to sell the vehicle for. In this instance, the reserve bid may not be required.

In one embodiment, a seller proxy module is configured to execute in the auction center 106 and performs seller proxies on behalf of a seller. A seller proxy is an adjustment of one or more seller parameters associated with a vehicle auction in an active state. Vehicle auction states will be further discussed below. In one embodiment, the adjustment is advantageously based on whether a bid has been received in the vehicle auction. When the seller proxy module executes, it can determine if the vehicle auction has received any bids. If a bid has been received, the seller proxy module will not perform a seller proxy in the vehicle auction. If a bid has not been received, the seller proxy module can determine if the start minimum bid is larger than the sum of the low minimum bid and the decrement amount. If the start minimum bid is larger, then a seller proxy can be performed. As an example, a seller may advantageously specify a start minimum bid of $8,000, a decrement amount of $200, and a low minimum bid of $7,000 in offering a vehicle for auction. If the vehicle auction has not received a bid, a seller proxy decrement will advantageously be performed, and the start minimum bid is decreased to $7,800. In another embodiment, a seller proxy can be performed as long as the start minimum bid is larger than the low minimum bid and a bid in an amount equal to or greater than the reserve bid has not been received for the vehicle auction. If decreasing the start minimum bid by the decrement amount causes the start minimum bid to be smaller than the low minimum bid, then the start minimum bid will advantageously be set equal to the low minimum bid.

In one embodiment, the seller proxy module is executed by the auction center 106 at appropriate time intervals. The time interval may advantageously be predetermined by the auction center 106 and is substantially long enough to allow potential bidders to become aware of the vehicle auction and to submit bids in the vehicle auction. The time interval may not be too long such that the vehicle auction will close without generating the desired interest as measured by the number of bids. In one embodiment, the time interval is one (1) hour such that the proxy module is executed every one hour on the hour. In another embodiment, the time interval may be set to a figure substantially less than one (1) hour or substantially greater than one (1) hour. In still another embodiment, the time interval may be dynamically reduced by the auction center 106 based on the time remaining before the vehicle auction closes. In a further embodiment, the seller may specify, for a seller's vehicle auction, a time interval which determines the frequency the seller proxies are performed. In still a further embodiment, the seller may specify a variable time interval which determines the frequency in which seller proxies are performed. As an example, the seller may specify that the seller proxies are to be performed with increasing frequency as the vehicle auction progresses in time.

The auction center 106 contains one or more vehicle auctions submitted by one or more sellers. Each vehicle auction includes an auctioning of one vehicle. Some of the sellers requested seller proxies to be performed by the auction center 106 for their vehicle auctions. Other sellers did not request seller proxies to be performed on their behalf. The seller proxy module, at the time of execution, has to determine the vehicle auctions that requested seller proxies, and perform the seller proxies on behalf of the seller.

In one embodiment, the seller proxy module can determine the vehicle auctions that requested seller proxies by using a seller proxy list maintained in memory. The seller proxy list identifies vehicle auctions that are currently in the active state and that have requested seller proxies to be performed. For example, if the seller specifies a decrement amount greater than zero (0), the vehicle auction can be included in the seller proxy list at substantially the time the vehicle auction becomes active. The seller proxy module then takes the vehicle auctions identified in the seller proxy list one at a time and performs the seller proxies on behalf of the seller. If, in performing the seller proxy, the seller proxy module determines that subsequent seller proxies cannot be performed in the vehicle auction, the vehicle auction is removed from the seller proxy list. As one example, if the seller proxy module determines that a vehicle auction has received a bid, then the vehicle auction can be removed from the seller proxy list. As another example, if the start minimum bid is not greater than the low minimum bid for a vehicle auction, the vehicle auction can be removed from the seller proxy list. As still another example, if the vehicle auction no longer is in the active state, then the vehicle auction is removed from the seller proxy list.

In another embodiment, the auction center 106 may use a default decrement amount such as $100. In this instance, the seller can request seller proxies to be performed by specifying a different value for the start minimum bid and the low minimum bid for a vehicle auction. For example, the seller can request seller proxies by setting the low minimum bid lower than the start minimum bid. The vehicle auction can then be included in the seller proxy list upon becoming active. Vehicle auction states will be further discussed below.

In one embodiment, the seller advantageously provides additional product data such as, by way of example, a vehicle condition and a vehicle title statement. For example, the vehicle condition may be either good, fair, or poor. The vehicle title statement comprises information such as, by way of example, free and clear, odometer rollbacks, and frame damage. In another embodiment, the seller may request an independent third party vehicle appraiser, through the auction center 106, to determine either, or both, the vehicle condition and the vehicle title statement. The third party vehicle appraiser can be pre-selected by the online product auction system administrator to provide this service. The auction center 106 can then contact the appropriate vehicle appraiser and provide the appraiser the information necessary for the appraiser to perform the requested service.

At a set offer settings step 208, a seller may advantageously request the auction center 106 to notify the seller based upon one or more seller specified auction events. The auction events may include activities such as, by way of example, a receipt of a bid, a seller proxy, and a vehicle auction state change. Furthermore, the seller can specify the method of notification. As an example, the seller can request the auction center 106 to notify the seller by a means such as e-mail, page, fax, or phone.

Figure 3:
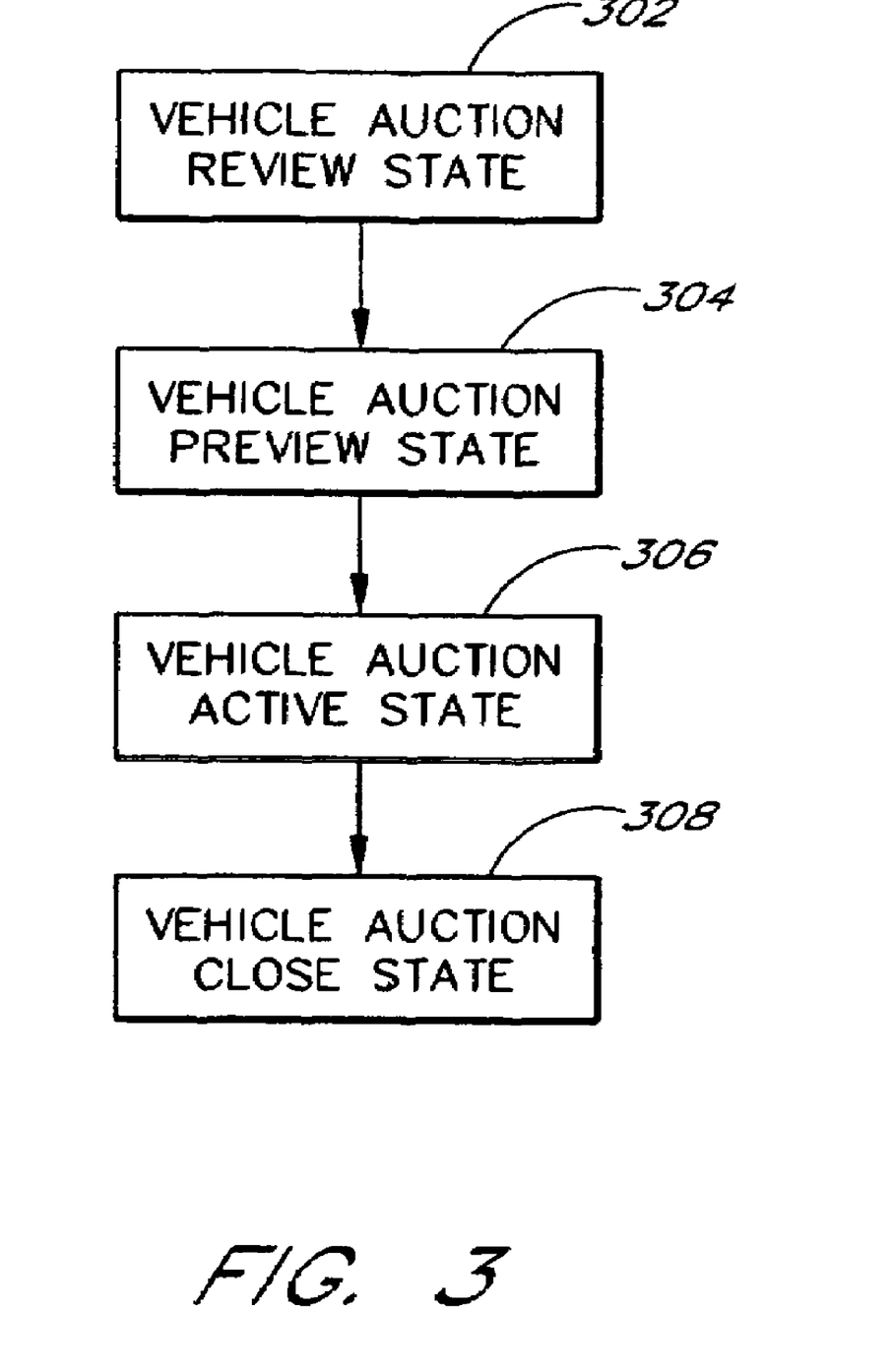
FIG. 3 is a flow chart illustrating the vehicle auction states according to one embodiment of the invention.

FIG. 3 is a flow chart generally illustrating the vehicle auction states according to one embodiment of the invention. In this embodiment, a vehicle auction is established for each vehicle submitted for auction by a seller. When the auction center 106 creates a vehicle auction, the vehicle auction is initially assigned to a vehicle auction review state at a step 302. During the review state, the auction center 106 may advantageously permit the seller to modify the seller's vehicle auction including removing the vehicle auction from the auction center 106. For example, the seller can modify some or all of the product data and the seller parameters associated with the vehicle auction. In one embodiment, the auction center 106 does not make the vehicle auction available to potential bidders while it is in the review state. Accordingly, potential bidders may not submit bids in the vehicle auction while it remains in a review state. In another embodiment, the auction center 106 may make some of the information associated with a vehicle auction in a review state available to potential bidders. As an example, the auction center 106 might provide information that gives an indication of a number of vehicle auctions for a specific model vehicle which are upcoming. The potential bidders may then plan for the upcoming vehicle auctions.

In one embodiment, the vehicle auction remains in the vehicle auction review state until the subsequent 8:00 A.M.

local time. The local time is advantageously the time in the time zone at the seller's location. Thus, if a seller located in New York submits a vehicle auction, the auction center 106 performs time calculations according to the time zone for New York. As an example, if a vehicle auction was established at 7:50 A.M. local time, the vehicle auction will remain in the review state until 8:00 A.M. local time, or for the next ten (10) minutes. In another example, if a vehicle auction was established at 8:01 A.M. local time on a Monday, the vehicle auction will remain in the review state until 8:00 A.M. local time of the following Tuesday. In another embodiment, the auction center 106 may permit the seller to specify a review-to-preview state transition time, the time when the seller's vehicle auction changes from the review state to a subsequent state. In yet another embodiment, the auction center 106 can perform appropriate time calculations based on a single predetermined time zone such as the time zone appropriate for the location of the online product auction system 104.

At a step 304, the auction center 106 transitions the state of a vehicle auction from a review state to a preview state at substantially the subsequent 8:00 A.M. local time. For example, a vehicle auction submitted by a seller in New York at 2:00 A.M. Monday will transition to a preview state at 8:00 A.M. Monday, New York time. A vehicle auction submitted by a seller located in London England at 7:00 P.M. Monday will transition to a preview state at 8:00 A.M. Tuesday, London time. In another embodiment, if the auction center 106 permits the seller to specify the review-to-preview state transition time for a vehicle auction, the auction center 106 can change the state of the vehicle auction at the time specified by the seller.

In one embodiment, a vehicle auction becomes visible to, and accessible by, potential bidders through the online product auction system 104 upon transitioning from a review state to a preview state. In one embodiment, the potential bidders are the vehicle dealers having access to the Data Center system detailed in the commonly owned U.S. patent application entitled REAL TIME COMMUNICATION OF PURCHASE REQUESTS having the Ser. No. 09/231,409, filed Jan. 14, 1999, and now U.S. Pat. No. 6,282,517, and which is hereby incorporated by reference in its entirety. Upon transitioning into the preview state, the vehicle auction advantageously remains in the preview state for six (6) twenty-four (24) hour periods. The auction center 106 is advantageously configured to not accept seller modifications to the product data or the seller parameters associated with a vehicle auction that is beyond the review state. Moreover, the seller may advantageously not be permitted to remove a vehicle auction that is beyond the review state from the online product auction system 104. In another embodiment, the auction center 106 may permit the seller to modify seller parameters in order to request seller proxies even if the vehicle auction is beyond the review state.

The auction center 106 makes certain information associated with a vehicle auction in a preview state available to potential bidders. As an example, the auction center 106 may advantageously make available vehicle identifying information and a start minimum bid to enable a potential bidder to decide whether to submit a bid in the vehicle auction. In one embodiment, the bids accepted by the auction center 106 for a vehicle auction in a preview state can be treated as secret bids. A secret bid can also be referred to as a sealed bid, and is a bid that remains hidden, and thus, not visible or accessible by other potential bidders. Therefore, a potential bidder does not have access to previous bid information for the vehicle auction in a preview state. In another embodiment, a secret bid can be concealed from the seller. In still another embodiment, a bidder may advantageously be permitted to remove a previously submitted secret bid as long as the vehicle auction for which the bid was submitted is currently in the preview state.

Those of ordinary skill in the art will realize that the period of time a vehicle auction remains in the preview state is arbitrary, and the period of time may be any period of time sufficiently long enough to permit potential bidders to adequately consider bidding on a vehicle offered in a vehicle auction. The auction center 106 permits a potential bidder adequate time to determine whether or not to bid in a vehicle auction irrespective of the bidders location. In another embodiment, the auction center 106 may permit the seller to specify a preview duration time, the time a vehicle auction is to remain in a preview state before becoming active.

At a step 306, the auction center 106 transitions the state of a vehicle auction from a preview state to an active state. In one embodiment, a vehicle auction transitions to an active state at substantially the termination of the sixth ($6^{th}$) twenty-four (24) hour period in which a vehicle auction was in a preview state. The vehicle auction advantageously remains in the active state for a twenty-four (24) hour period. In another embodiment, the transition can occur at the termination of the preview duration time supplied by a seller. Those of ordinary skill in the art will realize that the period of time a vehicle auction remains in the active state is arbitrary, and the period of time may be any period of time sufficiently long enough to provide a vehicle auction a fair chance of resulting in a sale of the vehicle.

The auction center 106 determines a current high bid for a vehicle auction at substantially the time the vehicle auction transitions to an active state. The current high bid is determined from the secrets bids received while the vehicle auction was in the preview state. If no secret bids were received, the current high bid is set to zero (0). The auction center 106, in addition to the vehicle auction information made available while in the preview state, can additionally make the current high bid for the active vehicle auction available to potential bidders. Thus, a potential bidder may informatively submit a bid that has a potential of becoming the current high bid. Furthermore, some or substantial portions of the information relating to the bids received by an active vehicle auction may advantageously be made available to potential bidders while the vehicle auction is active. For example, the number of bids received in the vehicle auction, the number of proxy bids received in the vehicle auction, and the current high bid may be made available to potential bidders upon request. In another embodiment, some or substantial portions of the secret bids received by a vehicle auction may also be made available to potential bidders while the vehicle auction is active.

At a step 308, a vehicle auction transitions to a closed state at the termination of the active state. The auction center 106 then determines a winning bid and a winning bidder for the vehicle auction. The winning bid is the current high bid at the termination of the vehicle auction active state. The winning bidder is the bidder associated with the winning bid. The auction center 106 preferably notifies both the seller and the winning bidder. The notification can be by methods such as, by way of example, e-mail, fax, telephone, or page. In one embodiment, the method of communication can be previously specified by the seller and the winning bidder.

In another embodiment, the auction center 106 may provide a seller an option of requesting third party escrow services. The online product auction system 104 can previously arrange for one or more third party escrow service providers to perform escrow services in consummating a sale of a vehicle. In one embodiment, an escrow module is configured to execute in the auction center 106. If the seller specifies the desire to employ the services of an escrow service, the escrow module can notify the appropriate escrow service provider of the vehicle auction, including information such as, by way of example, the seller and the buyer. In one embodiment, the escrow service provider may be determined based on the location of the seller. The notification can be via predetermined methods such as, by way of example, e-mail, electronic document exchange, fax, phone, and page. Once notified, the escrow service provider can proceed to consummate the exchange of the vehicle for the winning bid amount. The escrow service provider can then notify the online product auction system 104 of the result of the escrow services. In another embodiment, an independent escrow service provider, or a trusted third party, can hold the vehicle, along with the necessary ownership documentation, during the vehicle auction to promote confidence in the vehicle auction.

In one embodiment, a sale finalize module can be configured to execute in the auction center 106. The sale finalize module can remove the vehicle auction from the auction center 106 if the escrow service was successful. If the escrow service was unsuccessful, or if escrow service was not selected, the sale finalize module may contact the seller to determine whether the vehicle auction can be removed from the auction center 106.

In one preferred embodiment, the operation of the online product auction system 104 comprises the following events. On Apr. 1, 1999, at substantially 4:00 P.M. Irvine time, a seller located in Irvine, Calif., submits a 1970 Pinto to be auctioned off by the auction center 106. Along with the submission of the Pinto, the seller also specifies a start minimum bid of $500, a reserve bid of $400, a decrement amount of $50, and a low minimum bid of $300. The auction center 104 creates a unique vehicle auction for this Pinto and initially sets the vehicle auction to a review state. While the vehicle auction is in the review state, the seller is able to make any modifications to the vehicle auction information including, but not limited to, removing the vehicle auction from the auction center 106. The vehicle auction is not made public, and thus, is not visible, to potential bidders while it is in a review state.

On Apr. 2, 1999, at substantially 8:00 A.M. Irvine time, the auction center 106 transitions the vehicle auction from the previous review state to a preview state. While in the preview state, the vehicle auction becomes public. Potential bidders are provided product information regarding the Pinto along with the seller requested start minimum bid of $500. Thus, a potential bidder will know that the seller of the Pinto is requesting that the bidding be started at $500. While the vehicle auction is in a preview state, the seller is advantageously not permitted to modify any seller parameters. In another embodiment, a seller who did not previously request seller proxies may advantageously be permitted to request seller proxies while the vehicle auction is in the preview state by specifying a decrement amount and a low minimum bid.

Potential bidders are advantageously permitted to bid on the vehicle auction while it is in the preview state. At 10:00 A.M. Irvine time on Apr. 2, 1999, a first bidder submits a bid in the vehicle auction by specifying an initial bid of $500 and a top bid of $700. At 11:00 A.M. on the same day, a second bidder submits a bid in the vehicle auction by specifying an initial bid of $500 and a top bid of $800. By specifying a different figure for the initial bid and the top bid, both the first bidder and the second bidder are requesting that proxy bids be generated on each bidder's behalf. The auction center 106 is advantageously configured to generate proxy bids in increments of $50 for the vehicle auction. The bids submitted in a vehicle auction in a preview state are treated by the auction center 106 as secret bids and thus, is not made known to other potential bidders. Therefore, the second bidder would not have known about the first bidder's bid.

Substantially at 8:00 A.M. on Apr. 8, 1999, Irvine time, the auction center 106 transitions the state of the vehicle auction from the previous preview state to an active state. Substantially at this time, the auction center 106 determines a current high bid for the vehicle auction. The current high bid is determined from the secret bids received while the vehicle auction was in the preview state. The current high bid for the Pinto auction will belong to the second bidder and be set to $750. The current high bid figure of $750 is made available to potential bidders while the vehicle auction is in the active state. Furthermore. the auction center 106 performs seller proxies when the vehicle auction is in the active state and no bids have been received in the vehicle auction. Because a bid was received during the previous portion of the vehicle auction, the requested seller proxies will advantageously not be performed after the vehicle auction transitions to the active state.

If no secret bids were received, the current high bid for the Pinto auction would be set to $0. In this instance, the auction center 106 will advantageously perform a seller proxy by decrementing the start minimum bid of $500 by the decrement amount of $50. The seller proxy will be performed for this vehicle auction once every hour until a bid has been received or the seller proxy will result in the start minimum bid being set to an amount lower than the specified low minimum bid of $300. For example, at 9:00 A.M. on Apr. 8, 1999, assuming no bids were received in the vehicle auction, the auction center 106 will advantageously perform a seller proxy and decrement the start minimum bid by $50 and set it to $450. Subsequent to this time, the potential bidders will be informed that the start minimum bid for this vehicle auction is $450.

While the vehicle auction is active, potential bidders are able to submit bids for the vehicle in the vehicle auction. At 1:00 P.M. on Apr. 8, 1999, Irvine time, a third bidder sees that the current high bid for the Pinto is $750. Thus, the third bidder submits a bid for the Pinto specifying an initial bid of $800 and a top bid of $900. Substantially at this time, the auction center 106 again calculates the current high bid for the Pinto auction. The newly determined current high bid will belong to the third bidder and be set to $850. The second bidder will no longer be considered because the second bidder's top bid of $800 is not sufficient to exceed the newly calculated current high bid of $850. The third bidder would not have known that the second bidder had requested a proxy bid, in the maximum amount of $800, to be performed on the second bidder's behalf.

Substantially at 8:00 A.M. on Apr. 9, 1999, Irvine time, the auction center 106 will close the Pinto auction by transitioning the vehicle auction state from the previous active state to a closed state. Substantially at this time, the auction center 106 determines a winning bid and a winning bidder. For the Pinto auction, the third bidder is the winning bidder with a winning bid of $850. Because the $850 is larger than the seller's reserve bid of $400, the seller is obligated to sell the Pinto to the third bidder for the winning bid of $850. The auction center 106 advantageously contacts both the seller and the third bidder and provides the necessary information to facilitate the transfer of the Pinto for the money.

In one embodiment, a potential bidder utilizes a web browser executing on a buyer terminal to obtain access the auction center 106 login web page. The potential bidder can then access the auction center 106 by submitting a login identification and password pair through the login web page. The login identification and password pair may be obtained by a method substantially similar to the previously discussed method in which a seller may obtain a login identification and password pair.

A bid processing module is configured to execute in the auction center 106. The bid processing module is further configured to receive one or more bids from one or more bidders and to associate the bid to the submitting bidder. The bid processing module can advantageously associate the bid to the submitting bidder by utilizing the login identification used by the bidder to obtain access to the auction center 106. A bidder is a potential purchaser of a vehicle offered in a vehicle auction. In one embodiment, the bidder may advantageously be a person or entity licensed by a governmental agency, such as the Department of Motor Vehicles, to deal in the buying, selling, and reselling of one or more vehicles.

In one embodiment, a bid data comprises a bid and may advantageously include an initial bid and a top bid. The auction center 106 can require the top bid to be as large as the initial bid. The initial bid is the bidder's starting bid or the floor bid. The top bid is the bidder's maximum bid or the ceiling bid. The auction center 106 may have advantageously predetermined a proxy increment. The proxy increment is a figure the bid processing module can use in submitting a proxy bid on a bidder's behalf. In one embodiment, the bid processing module can use a proxy increment of $50 in performing a proxy bid in a vehicle auction. As an example, in a vehicle auction, a first bidder can submit a bid containing an initial bid of $5,000 and a top bid of $6,000. At this point, a current high bid can be set to $5,000. Because the top bid is larger than the initial bid, the first bidder is requesting proxy bids to be performed on the bidder's behalf. A subsequent bidder may then submit a subsequent bid containing an initial bid of $5,100 and a top bid of $5,500. The bid processing module can then submit a proxy bid on behalf of the first bidder in the amount of $5,550. The current high bid subsequently becomes $5,550. In another embodiment, the auction center 106 can require bid figures to be in amounts that are multiples of the proxy increment. Advantageously, the bid processing module may also permit the bidder to specify a proxy increment for use by the bid processing module in submitting proxy bids on the bidder's behalf. In yet a further embodiment, the seller may specify a proxy increment that is to be used in submitting proxy bids in the seller's vehicle auction. For example, the seller can specify that for the seller's vehicle auction, all proxy bids are to be in increments of $10.

Figure 4:
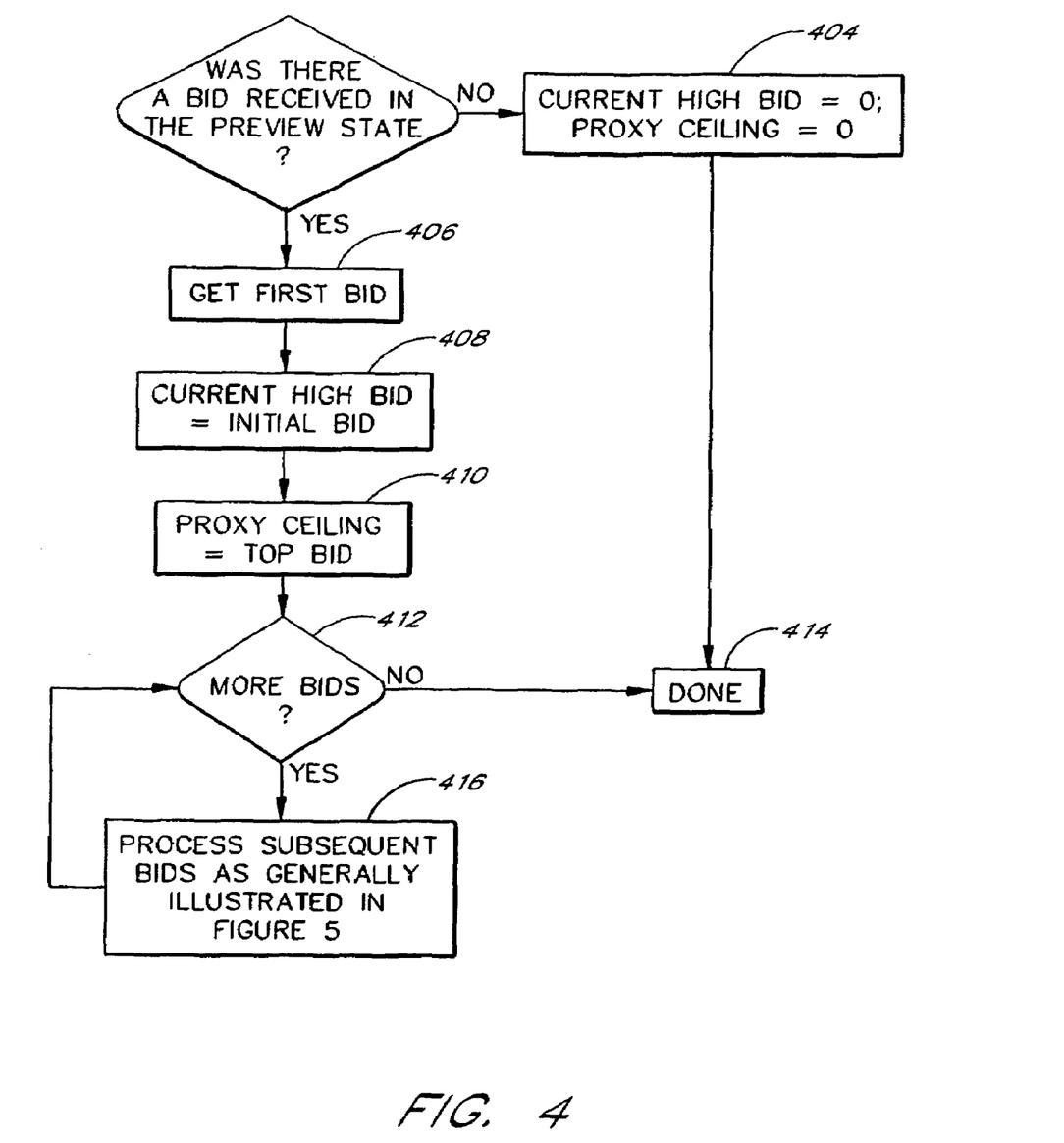
FIG. 4 is a flow chart illustrating a current high bid calculation in a vehicle auction transitioning from a preview state to an active state according to one embodiment of the invention.

FIG. 4 is a flow chart generally illustrating a calculation of a current high bid in a vehicle auction transitioning from a preview state to an active state according to one embodiment of the invention. This calculation of the current high bid is performed by the bid processing module substantially at the time the vehicle auction transitions to the active state. At a step 402, the bid processing module determines whether there are any bids submitted in the vehicle auction. The bids would be the secret bids which were accepted by the auction center 106 while the vehicle auction was in the preview state. If there are no secret bids for the vehicle auction, a current high bid is set to $0 and a proxy ceiling is set to $0 at a step 404. The bid processing module then proceeds to a step 414 and terminates processing the secret bids.

If the bid processing module determined there were one or more secret bids at the step 402, the bid processing module obtains the first bid data for the first secret bid at a step 406. In one embodiment, the bid data includes an initial bid and a top bid. If the bidder failed to specify either the initial bid or the top bid, the bid processing module can set the unspecified bid to the specified bid amount. As an example, if the bidder specified an initial bid of $10,000 and did not specify a top bid, the top bid can be set to $10,000. At a step 408, a current high bid is set to the initial bid. In another embodiment, if a top bid specified by a bidder is smaller than an initial bid specified by the bidder, the bid processing module may set the top bid to the initial bid. In still another embodiment, the bid processing module may set the current high bid to the vehicle auction's start minimum bid specified by the seller upon determining that the initial bid is larger than the start minimum bid. The bid processing module then sets a proxy ceiling to the top bid at a step 410. The proxy ceiling is the maximum amount the current high bidder is willing to bid for the vehicle. A proxy bid cannot be generated on behalf of the current high bidder that exceeds the proxy ceiling.

Figure 5:
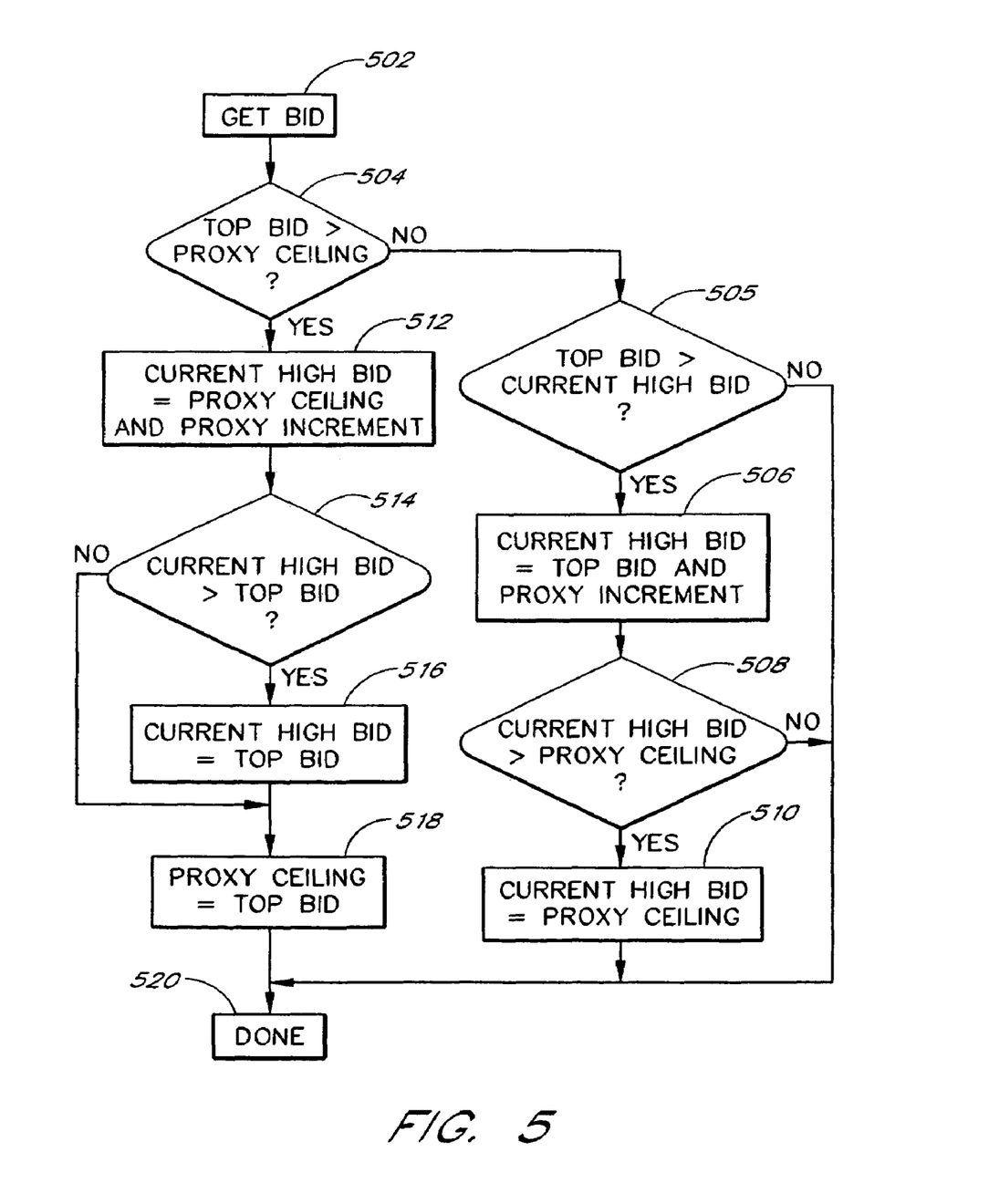
FIG. 5 is a flow chart illustrating a current high bid calculation in an active vehicle auction according to one embodiment of the invention.

At a step 412, the bid processing module determines if there are more secret bids to process for the vehicle auction. If there are no more secret bids to process, the bid processing module proceeds to the step 414 and terminates processing the secret bids. If there are more secret bids to process, the bid processing module proceeds to a step 416 and continues processing the subsequent secret bids one at a time. In one embodiment, the processing logic can be the same as the logic implemented for processing bids received while a vehicle auction is in an active state as illustrated in FIG. 5. The logic outlined in FIG. 5 processes a single subsequent bid. Therefore, after processing a subsequent secret bid as generally outlined in FIG. 5, the bid processing module loops back to the step 412 and determines if there are more secret bids to process. If there is, the logic generally outlined in FIG. 5 is again executed to process the next subsequent secret bid. This loop is repeated until all secret bids have been processed. When all secret bids have been processed, the bid processing module proceeds to the step 414 and terminates processing the secret bids.

FIG. 5 is a flow chart generally illustrating a calculation of a current high bid in an active vehicle auction according to one embodiment of the invention. At a step 502, the bid processing module receives a bid data for a new bid in the vehicle auction. At a step 504, the bid processing module determines whether the new bid's top bid is larger than the proxy ceiling. The proxy ceiling was previously determined, at the time the vehicle auction transitioned from the preview state to the active state (refer to the discussion above for FIG. 4), to be either $0 or the top bid associated with the current high bid. By utilizing the larger than inequality above, the bid received first in time is given priority if both bids specified the same top bid. In one embodiment, the auction center 106 can associate a receive time for each bid data.

If the new bid's top bid is not larger than the proxy ceiling, the bid processing module determines if the new bid's top bid is larger than the current high bid at a step 505. If the auction center 106 does not accept subsequent bids smaller than the current high bid, the check performed at the step 505 may be unnecessary. If the new bid's top bid is determined to be larger than the current high bid at the step 505, the current high bid is set to the sum of the new bid's top bid and a proxy increment at a step 506. The bid processing module then determines whether the current high bid is larger than the proxy ceiling at a step 508. If it is, then the current high bid is set equal to the proxy ceiling. Thus, the current high bid may not exceed the current high bidder's top bid. The bid processing module then proceeds to a step 520 and finishes processing. If the current high bid was determined to be not larger than the proxy ceiling at the step 508, or the new bid's top bid was determined to be not larger than the current high bid at the step 505, the bid processing module proceeds to the step 620 and finishes. In another embodiment, the bid processing module can determine if the new bid's top bid is larger than the sum of the proxy ceiling and the proxy increment at the step 504. In this instance, the auction center 106 may require a subsequent high bid to be larger than a prior high bid by at least the proxy increment.

If the bid processing module determined that the new bid's top bid was larger than the proxy ceiling at the step 504, the current high bid is set to the sum of the proxy ceiling and the proxy increment at a step 512. In another embodiment, the bid processing module may set the current high bid to the new bid's initial bid if the proxy ceiling is $0, thus indicating that the new bid is the first bid received in the vehicle auction. In yet another embodiment, the bid processing module may set the current high bid to the seller specified start minimum bid if the proxy ceiling is $0, and the new bid's initial bid is larger than the start minimum bid. The bid processing module then determines whether the current high bid is larger than the new bid's top bid at a step 514. If it is, then the current high bid is set to the new bid's top bid at a step 516. The bid processing module then sets the proxy ceiling to the new bid's top bid at a step 518 and then finishes at the step 520. If the current high bid was not larger than the new bid's top bid at the step 514, the bid processing module proceeds to the step 518.

In one embodiment, a bidder can request a bid event notification from the auction center 106. The request can be made at substantially the time of submitting a bid in a vehicle auction. The bid event notification can be based on one or more bid events specified by the bidder. A bid event is an event such as, by way of example, the bidder's bid being out bid, the bidder's bid being determined a winning bid, and a proxy bid being performed on the bidder's behalf. The bidder may specify the method of notification at the time of submitting the bid. The bidder may specify notification methods such as e-mail, fax, telephone, or page. In another embodiment, the bidder may request a bid event notification subsequent to submitting the bid for which notification is sought.

In one embodiment, a bid data can include a bid event notification request. Whenever the bid data is affected, the auction center 106 can determine if one or more notifications needs to be performed. In another embodiment, the auction center 106 can associate bid event notification requests with the associated vehicle auction. For example, each vehicle auction can be associated to a list of bid event notification requests. Thus, when an event occurs in the vehicle auction, the auction center 106 can access the list of bid event notification requests to determine if any notifications need be performed.

In one embodiment, a potential bidder may advantageously request notification of one or more vehicle auctions from the auction center 106. The potential bidder may specify one or more auction search criteria such as, by way of example, vehicle type, vehicle model, vehicle make, vehicle condition, and vehicle location. The potential bidder may additionally specify a notification method such as, by way of example, e-mail, telephone, fax, or page. The auction center 106 can maintain the vehicle auction notification request in a vehicle auction notification database. In one embodiment, whenever a vehicle auction transitions to a preview state, the auction center 106 can search the database to determine if any notifications need to be performed.

In one embodiment, a login module is configured to execute in the auction center 106. The login module is advantageously comprised of one or more web page definitions, and advantageously displays a first web page on a user terminal. The login module requests through the first web page a login identification and password pair. A user, either a potential bidder or a potential seller, can access the auction center 106 by providing a valid login identification and password pair. The online product auction system 104 is configured to display auction data regarding one or more vehicle auctions on the user terminal.

The auction data includes information regarding one or more vehicle auctions in the auction center 106. The auction data may advantageously be displayed as one or more URL links to one or more web pages providing access to the vehicle auction. The auction data can be displayed in a scrolling ticker, similar to a stock market ticker, appearing in a portion of the one or more web pages comprising the auction center 106. The scrolling ticker displaying the URL links may advantageously be implemented utilizing the freeware program "ticker.class." This program takes as input contents of a text file containing one or more text strings and its associated URLs. The program reads the text strings contained in the text file, and displays the text string contents in a scrolling ticker as a selectable hypertext link enabling access to a web page addressed by the associated URL.

In one embodiment, a user, having logged on to the auction center 106, can request the auction center 106 to display the scrolling ticker containing the auction data. The user may specify one or more parameters that the auction center 106 can use in filtering the content of the scrolling ticker. As an example, the user may specify parameters such as vehicle type, one or more specified vehicle auctions, vehicle auction region, and bid-by-bid display. The auction center 106 can search for the vehicle auctions satisfying the one or more filtering parameters. The auction center 106 can dynamically modify the text file used by ticker.class to include the results of the search. The results of the search can advantageously be displayed in the scrolling ticker.

In another embodiment, the auction data may be displayed on a vehicle dealer terminal. The auction data may advantageously be stored on one or more storage mediums 108. The vehicle dealer terminal is a terminal used by a vehicle dealer to access the Data Center system. In this embodiment, the vehicle dealer can be a seller or a potential bidder in the online product auction system 104. Having accessed the Data Center system, the Data Center system can display on the vehicle dealer terminal a scrolling ticker containing information regarding the one or more vehicle auctions contained in the auction center 106. The vehicle dealer can advantageously filter the contents of the scrolling ticker as described above. Furthermore, the storage mediums 108 may advantageously be the storage mediums detailed in the co-pending and commonly owned U.S. patent application entitled REAL TIME COMMUNICATION OF PURCHASE REQUESTS having the application Ser. No. 09/231,049 and the filing date of Jan. 14, 1999, and which is hereby incorporated by reference in its entirety. The Data Center system and vehicle dealer are also detailed in the co-pending and commonly owned U.S. Patent application previously mentioned. In particular, the storage medium becomes the linking element between the Data Center and the auction center. Thus the dealers participating in the Data Center may advantageously participate in one or more vehicle auctions by submitting one or more vehicles from inventory to the auction center and by bidding in one or more vehicle auctions conducted by the auction center.

This invention may be embodied in other specific forms without departing from the essential characteristics as described herein. The embodiments described above are to be considered in all respects as illustrative only and not restrictive in any manner. The scope of the invention is indicated by the following claims rather than by the foregoing description.

What is claimed is:

1. An online product auction system comprising an auction center, said auction center includes a microprocessor operably connected to a storage media, said product auction system comprising:
    a current high bid value for a first product;
    a first bid data for said first product, said first bid data includes a first bid and a second bid, said first bid is greater than said current high bid value, and said second bid is greater than said first bid;
    a second bid data for said first product, said second bid data includes a third bid and a fourth bid, said third bid is greater than said current high bid value, and said fourth bid is greater than said third bid;
    a bid processing module which calculates and updates said current high bid for said first product;
    a start minimum bid;
    a low minimum bid;
    a current minimum bid; wherein the current minimum bid, at the start of an auction, is equal to the start minimum bid; and
    a seller proxy module configured to periodically determine whether a bid at least as great as the current minimum bid has been accepted, and if no such bid has been accepted, to adjust the current minimum bid downward to a value less than the start minimum bid but at least as great as the low minimum bid.

2. The auction system as defined in claim 1, wherein said bid processing module further comprises:
    a first calculation mode which calculates said high bid for said first product when said product auction system is in a first state; and
    a second calculation mode which calculates said high bid for said first product when said product auction system is in a second state.

3. An online product auction system comprising an auction center, said auction center includes a microprocessor operably connected to a storage media, said product auction system comprising:
    a current high bid for a first product, said current high bid is associated with a first bid data wherein said first bid data includes a first bid and a second bid, said first bid is greater than said current high bid, and said second bid is greater than said first bid;
    a second bid data for said first product, said second bid data includes a third bid and a fourth bid, said third bid is greater than said current high bid, and said fourth bid is greater than said third bid;
    a start minimum bid;
    a low minimum bid;
    a current minimum bid; wherein the current minimum bid, at the start of an auction, is equal to the start minimum bid; and
    a seller proxy module configured to periodically determine whether a bid at least as great as the current minimum bid has been accepted, and if no such bid has been accepted, to adjust the current minimum bid downward to a value less than the start minimum bid but at least as great as the low minimum bid.

4. The online product auction system of claim 1, 2, or 3, further comprising a decrement amount, wherein the seller proxy module adjusts the current minimum bid downward by the decrement amount.

\* \* \* \* \*

UNITED STATES PATENT AND TRADEMARK OFFICE
CERTIFICATE OF CORRECTION

| | | |
|---|---|---|
| PATENT NO. | : 7,219,080 B1 | Page 1 of 1 |
| APPLICATION NO. | : 09/283120 | |
| DATED | : May 15, 2007 | |
| INVENTOR(S) | : Kevin J. Wagoner et al. | |

It is certified that error appears in the above-identified patent and that said Letters Patent is hereby corrected as shown below:

Column 11, Line 45:

Please delete "received" and insert therefor --receives--

Column 22, Line 3:

Please delete "haying" and insert therefor --having--

Signed and Sealed this

Twenty-eighth Day of August, 2007

JON W. DUDAS
*Director of the United States Patent and Trademark Office*